Nov. 22, 1932.  C. H. GUNN  1,888,499
RESILIENT RAIL CAR WHEEL
Filed Oct. 27, 1931
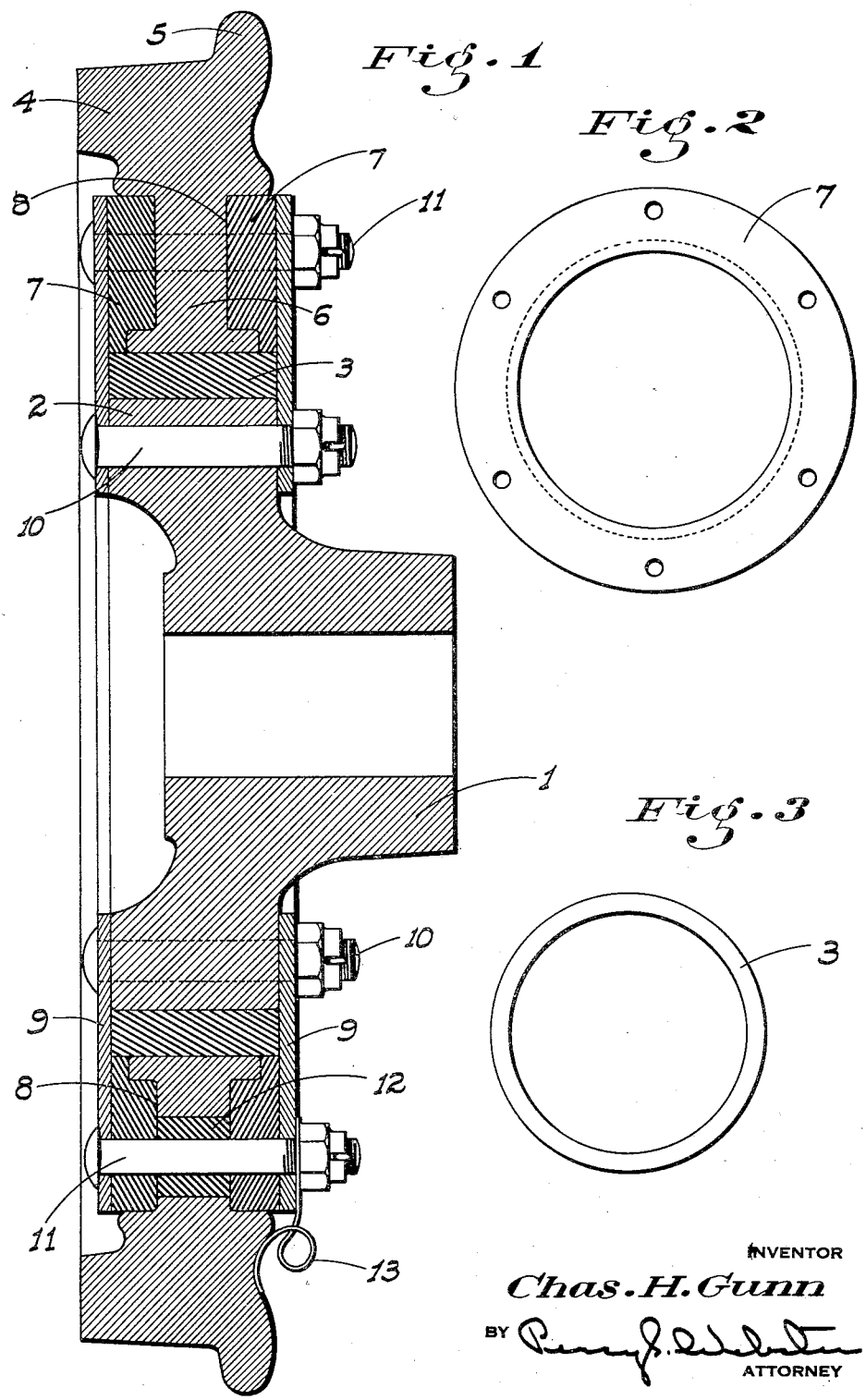
INVENTOR
Chas. H. Gunn
BY
ATTORNEY Patented Nov. 22, 1932

1,888,499

UNITED STATES PATENT OFFICE

CHARLES H. GUNN, OF BURLINGAME, CALIFORNIA

RESILIENT RAIL CAR WHEEL

Application filed October 27, 1931. Serial No. 571,329.

This invention relates to resilient street car and similar track engaging wheels and particularly represents improvements over the structure shown in my Patent No. 1,840,898 dated January 12, 1932.

My principal object now is to provide a wheel of the same general character as disclosed in said patent and for the same purpose, but one in which the resilient rubber parts which give the desired resiliency, as well as the metal castings, are simplified and are easier to construct and install; and said rubber parts are protected throughout from exposure to the air and from contact with any other deteriorating influences. The same advantages in operation are therefore obtained as before with the additional advantages of lessened expense for upkeep, cheaper construction and lower labor costs for assembling and changing operations.

These objects I accomplish by means of such structure and relative arrangement of parts as will fully appear by a perusal of the following specification and claims.

In the drawing similar characters of reference indicate corresponding parts in the several views:

Fig. 1 is a sectional elevation of my improved wheel structure.

Fig. 2 is a front view of the resilient band.

Fig. 3 is a similar view of one of the resilient side rings.

Referring now more particularly to the characters of reference on the drawing, the numeral 1 denotes the hub of the wheel which is bored for engagement with the axle in the usual manner; said hub having a radial and outwardly projecting relatively thick flange 2 about its outer end. An endless band 3 of resilient material, such as rubber, and the same width as the flange extends thereabout and is fitted snugly thereon.

The rim portion 4 of the wheel having the usual track engaging flange 5 is provided with a radial inwardly projecting web 6 which fits snugly on the band 3, so that a cushion mounting is thus provided between the rim and hub. The web is of lesser width than the band 3 and engages the same symmetrically relative to such width.

Side rings 7 of rubber and separate from the band 3 fit over the same to the sides of the web and extend thence to the rim 4. The web intermediate its ends is provided with circumferential recesses on both sides as at 8, the rings being shaped to fit in and fill said recesses. Metal side plates 9 engage and are rigidly secured to the sides of the hub flange 2 by means of bolts 10, said plates extending over and engaging the rings to the outer periphery of the same. Other bolts 11 project through the plates, rings, and through the web 6, the bolt holes in the latter being relatively large and being filled with rubber sleeves 12 which are placed about the bolts between the rings.

It will therefore be seen that the hub and rim of the wheel are mounted in resilient driving relation with each other in such a manner that the rim may yield both radially and laterally relative to the hub, and also circumferentially to a limited extent, as determined by the give or compression of the various rubber elements. The side rings 7 by reason of their particular mounting aid the band 3 in cushioning the rim radially as well as allowing the same limited lateral play. To provide for a continuous metal connection between the hub and the rim as is necessary to convey the electric current, I mount a yieldable or flexible metal conductor 13 between one of the plates 9 and the rim. This conductor may be welded to the rim but would preferably be removably secured to the plate by means of the nut of one of the bolts 11 so as not to interfere with removal of the plates if necessary.

The entire arrangement of parts of the wheel makes the same very simple and easy to construct and assemble and it is therefore an easy matter to remove and replace any part when necessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A resilient car wheel comprising a hub portion, a rim portion separate therefrom, a resilient endless band between and engaging such portions, rigid side plates secured to the hub and projecting thence radially and beyond the band in overlapping relation to the rim portion, bolts through the plates and said portion, the latter having relatively large holes through which the bolts project, resilient spacers about the bolts for the width of said portion and filling the holes and resilient side rings seated between the plates and the adjacent surfaces of the rim portion.

2. A resilient car wheel comprising a hub portion, a rim portion separate therefrom, a resilient endless band between and engaging such portions, resilient side rings about the band to the sides of the rim portion and extending from said band outwardly alongside said rim portion, the latter having circumferential recesses in its opposite sides into which the rings project, and means tying said rings, hub and rim portions together in driving relationship without interfering with relative radial and lateral play between the hub and rim.

In testimony whereof I affix my signature.

CHARLES H. GUNN.